Oct. 31, 1950     R. M. SMYTH-DÁVILA     2,527,771
REMOTE ANGULAR POSITION INDICATOR
Filed July 4, 1945
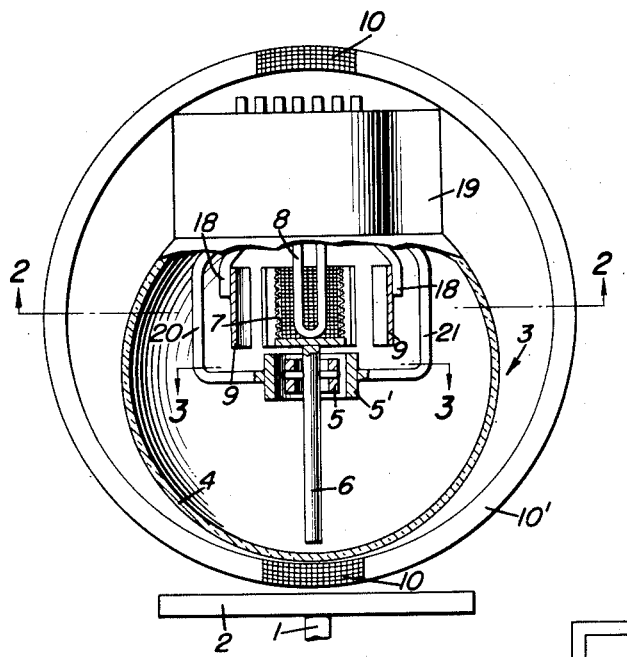
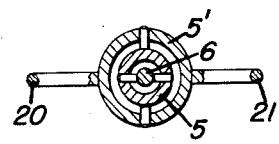
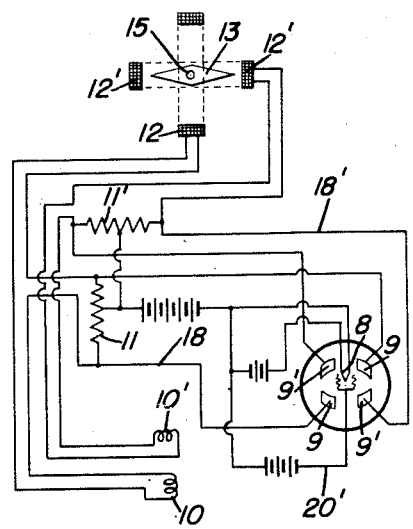
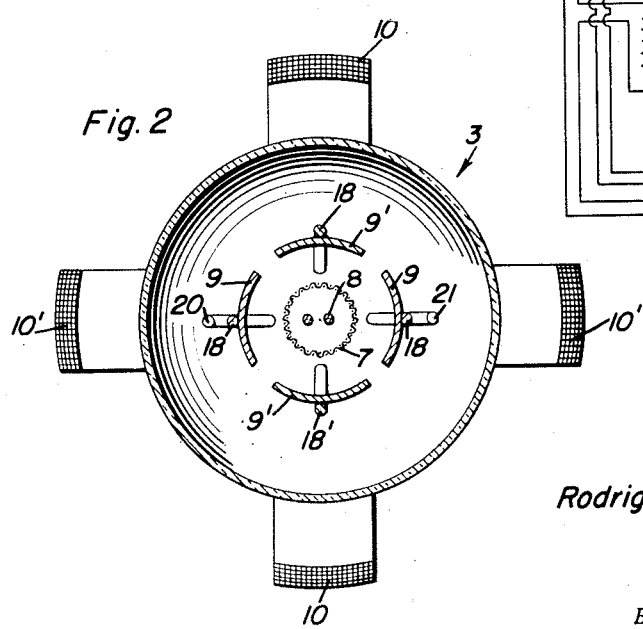
Rodrigo M. Smyth-Dávilla
INVENTOR.

Patented Oct. 31, 1950

2,527,771

UNITED STATES PATENT OFFICE 2,527,771

REMOTE ANGULAR POSITION INDICATOR

Rodrigo M. Smyth-Dávila, San Jose, Costa Rica

Application July 4, 1945, Serial No. 603,155

7 Claims. (Cl. 177—351)

This invention relates in general to apparatus for the remote indication of the direction of a force or a magnetic field.

It is an object of the invention to produce a remote indicating magnetic compass of great simplicity and reliability.

Another object of the invention is to provide a simple and accurate system for the remote indication of the angular position of a rotatable member of any kind whose position it is desirable to determine at a distance, such as the indicating element of an instrument.

Further objects and advantages of the invention will appear from the following description.

The invention is illustrated in the accompanying drawing, showing one embodiment thereof by way of example. The example illustrates the principle of the invention and the best mode of applying said principle.

Referring to the drawings,

Figure 1 is a partly sectional elevational view of an electronic tube forming the main unit of the system embodying the invention.

Figure 2 is a partly sectional plan view of the electronic tube shown in Figure 1, the section being taken along line 2—2 of Figure 1.

Figure 3 is a sectional plan view of the structure housed in the interior of the electronic tube, the section being taken along line 3—3 of Figure 1.

Figure 4 is a diagram of the system showing the connections.

A system according to the invention comprises a detecting and transmitting unit which is illustrated in some detail in Figures 1, 2 and 3.

This unit consists of an electronic tube, generally indicated at 3, which comprises a base 19 carrying an evacuated glass bulb 4 within which a small magnet 6 is mounted with at least two degrees of freedom in directions which are perpendicular to the longitudinal axis of the magnet. For this purpose the magnet is mounted on gimbal rings 5, 5' which are carried by metal brackets 20 and 21. One of the brackets 20 may also form a lead-in conductor, passing from the interior of the tube to the outside.

The brackets 20, 21 are preferably held in the customary press formed at the base of the glass bulb during the sealing operation of the said bulb. Attached to one end of said magnet is a controlling grid 7 in the form of a cylindrical wire mesh. In the center of the grid is the filament 8 and around the grid there are two pairs of plates 9 and 9', the plates of each pair being fixed at diametrically opposite points normally equidistant from the grid 7. Two windings 10 and 10', which are hereinafter termed "opposition windings," are fixed to the tube 4 with their planes normal to each other and parallel to the longitudinal axis of magnet 6.

A diagram of connections is shown in Fig. 4.

The two pairs of plates 9 and 9' are respectively connected through leads 18 and 18' to the ends of resistances 11 and 11' which in their turn are connected respectively to the opposition windings 10 and 10', while the middle point of both resistances is connected to the filament 8. The grid 7 is kept preferably at a negative potential through lead 20. In operation: an equal current flows normally from each pair of plates 9, 9' through each half of the resistances 11 and 11' and no difference of potential will exist between the ends of each of said resistances so that no current will flow through the opposition windings. But any slight movement of magnet 6 will change the central position of the grid with the result that a stronger current will flow from the plate or plates nearer to the grid, thus creating a difference of potential between the ends of the corresponding resistance, with the result that a current, which hereinafter will be termed "opposition current," will circulate through the corresponding opposition winding 10 or 10', the connections being so arranged that the magnetic field produced acts on the magnet 6 so as to oppose its original movement. In this way, as long as no external force acts on the magnet, the grid 7 will be kept in a central position and no magnetic field will be produced by either of the opposition windings. But if a force tending to rotate the magnet is applied in any direction, a small displacement of said magnet will take place and, as explained, an opposing magnetic field will be produced the strength of which will be exactly proportional to the magnitude of the force, while its polarity will depend on the direction of the force, the intensity of the electric current in each opposition winding being proportional to the component of the force perpendicular to the winding, while its direction will correspond to the direction of said component.

If the force acting on the magnet is produced by a magnetic field, the opposing field will have the direction of the original field. If both the original and the opposing fields are uniform so that their lines of force are parallel, the magnetic field acting on the magnet will be entirely cancelled, but if either the original or the opposing field, or both, are not uniform, the original field will be partially cancelled in some areas and inverted in others, but the effect on the magnet will always be a total cancellation of the forces acting on same, except of course the small portion of said forces which is taken up by friction on the supporting pivots which, by proper design, may be reduced to such an extent as to be insignificant.

Fig. 4 illustrates a repeater unit for the remote indication of the force or magnetic field acting on the magnet 6 of Fig. 1. It consists of two windings 12 and 12', hereinafter termed "repeater windings," which are substantially arranged in planes at right angles to each other and which are connected in series with the opposition windings 10 and 10'. The current flowing through each opposition winding will therefore also flow through the corresponding repeater winding and consequently a resultant magnetic field will be produced in said repeater unit having a direction relatively to the repeater windings which is the same as the direction of the opposing field produced in the detecting unit relatively to the opposition windings. A magnetic needle 13 is pivoted in the center of the repeater windings for rotation about an axis parallel to the plane of both windings so that the needle will assume a position along the magnetic field created by said windings. An indicating element of any suitable type may be fixed to the shaft 15 of the magnetic needle. This repeater unit may be installed in any desired position whether horizontal, vertical or inclined.

The above described detecting and transmitting unit in combination with the repeater unit may have numerous useful applications such as the construction of a remote indicating magnetic compass. The detecting and transmitting unit illustrated in Figs. 1, 2 and 3 consists of a special electronic tube 3 comprising a glass envelope 4 mounted on a base 19 within which a small magnet 6 is mounted on gimbal rings 5 and 5' with at least two degrees of freedom about axes normal to its longitudinal axis. Said gimbal rings are mounted on metal members 20 (which also serves as lead) and 21 which are supported in a well known manner by a "press" or seal (not shown) located at the base. All other leads are similarly supported by said seal.

Another important application of the invention consists in the remote indication of the angular position of a rotatable member such as the indicating element of an instrument. For this purpose the arrangement shown in Fig. 1 is utilized in which 1 represents the shaft of any kind of instrument to which the indicating pointer would ordinarily be fixed. Instead of the pointer a magnet 2 is mounted on said shaft which thus provides a rotatable magnetic field the angular position of which is detected by the electronic tube 3 which is fixed slightly above the magnet 2 without making contact with same. The longitudinal axis of the tube's magnet 6 is exactly aligned with the shaft 1 supporting said magnet 2 so that the interaction between both magnets will always take place along a radial plane parallel to the longitudinal axes of both magnets 2 and 6 without interfering with the freedom of movement of the former. Magnet 6 will tend to rotate along such a plane, producing, as previously explained, two component opposing fields in the opposition windings 10 and 10' which will be reproduced in the repeater windings 12 and 12' of the remote indicator. The repeater needle 13 will thus assume a position corresponding to that of the magnet 2.

Other useful applications of the principle of the present invention are described in my patent application Serial No. 603,156, filed July 4, 1945, entitled "Remote Indicating Gyroscopes."

Although the most convenient arrangement of the opposition windings is with their planes at right angles to each other, the only essential requirement is that they be installed in the same position relatively to each other as the corresponding repeater windings. To produce the opposition currents other known means, such as a variable resistance responsive to a magnetic field, could be used instead of the electronic tube with its movable magnet. Also a liquid rheostat could be used as described in my aforesaid patent application.

Other changes and modifications may be made in carrying out my invention into practice without departing from its true spirit and scope and I desire to have it understood that the above description and drawings are only illustrative and not to be interpreted in a limiting sense.

What I claim and desire to secure by Letters Patent is:

1. A system for the remote indication of angular motion comprising a magnetic member, pivotally mounted for free movement in a plurality of directions and adapted to be moved by an external magnetic field, opposition coils surrounding said magnetic member angularly spaced from each other, means for supplying said opposition coils with current, means for controlling the current flow through said coils, including a common electrode, a number of further electrodes, a plurality of current paths between said common electrode and said further electrodes, and means for controlling simultaneously the current flow through said current paths, operated by the magnetic member, the current flow in each opposition coil producing an electromagnetic action on the magnetic member counteracting the movement of the same, and indicating means for indicating the movement of the magnetic member including a further magnetic member and electromagnetic repeater coils acting on the same, supplied with the currents flowing through the current paths controlled by the magnetic member and through the opposition coils.

2. A system for the reproduction and remote indication of angular motions comprising a magnetic member pivotally mounted for free movement in two directions at right angles to each other, a further magnet, the movement of which has to be indicated remotely, arranged in proximity to the first named magnetic member and rotatable around an axis passing through the pivot of the said first named magnetic member, opposition coils surrounding said magnetic member angularly spaced with respect to each other, means for supplying said opposition coils with current, means for controlling the current flow through said coils by said first named magnetic member, said means including a common electrode and a number of further electrodes, a plurality of current paths between said common electrode and said further electrodes, means for controlling simultaneously the current flow through said current paths, operated by the first named magnetic member, the current flow in each opposition coil producing an electromagnetic action counteracting the movement of the said first named magnetic member, and an indicating member reproducing the movement of the said further magnet and including a further magnetic member and electromagnetic repeater coils acting on the same, supplied with the currents flowing through the opposition coils and controlled by the first named magnetic member.

3. A system for the remote indication of angular motion, comprising a magnetic member pivotally mounted for free movement in two directions at right angles to each other, opposition coils surrounding said pivotally mounted magnetic member and angularly spaced with respect to each other, means for supplying said coils with current, means for regulating the flow of current through said coils, including a common electrode supplied with current and a group of further electrodes surrounding said common electrode forming pairs, the members of which are both facing the common electrode and each other, each pair of electrodes being connected with one opposition coil, current paths being formed between said common electrode and said group of further electrodes, means including said magnetic member for regulating the current flow through said current paths, an equal current flow to the electrodes of one pair keeping the opposition coil connected with said pair free of current, while a displacement of the magnetic member produces a different regulation of the current flow in the current paths between the common member and the two electrodes of the pair of electrodes facing each other, engendering a current flow through the opposition coil with which the pair is connected, said current flow producing an electromagnetic action of the opposition coil on the magnetic member counteracting the movement of the magnetic member which produced the current flow in the opposition coils, and an indicator for indicating the movement of the magnetic member, including a further magnetic member and electromagnetic repeater coils acting on the same, supplied with the currents controlled by said first named magnetic member and flowing through the opposition coils.

4. A system for the remote indication of angular motion comprising a magnetic member pivotally supported for free movement in two directions at right angles to each other, opposition coils surrounding said member and arranged with their axes at right angles to each other, means for supplying said coils with current, an electronic tube including a common electrode and a group of further electrodes surrounding the same, said further electrodes being arranged in pairs facing the common electrode at diametrically opposed points, a plurality of current paths being formed between said common electrode and the group of surrounding electrodes, a movable common control electrode intersecting all said current paths, said control element being connected with and moved by the magnetic member, and being arranged for equal action on all the current paths in its position of rest, two electrodes of the surrounding group and arranged at diametrically opposite points forming a pair being both connected with one of the opposition coils, an equal current flow to the electrodes of one pair keeping the opposition coil connected with said pair free of current, while displacement of the magnetic member produces a different regulation of the current flow in the current path between the common member and the two electrodes of a pair of diametrically opposed electrodes, engendering a current flow through the opposition coil with which the pair is connected, said current flow producing an electromagnetic action of the opposition coil on the magnetic member counteracting the movement of the magnetic member which produced the current in the opposition coils, and an indicator indicating the movement of the magnetic member and including a further magnetic indicating member, and electromagnetic repeater coils acting on the same, supplied with currents flowing through the opposition coils, and controlled by the first named magnetic member.

5. A system for the remote indication of angular motion comprising an electronic tube, having an evacuated container, a cathode and a group of plates therein, said plates being arranged in pairs facing each other and the cathode at diametrically opposite points, a movable control grid surrounding said cathode, a magnetic member pivotally suspended within said evacuated container for free movement in two directions and adapted to be moved by a magnetic field external to the container, said magnetic member carrying the movable control grid member, opposition coils surrounding the evacuated container, arranged with their axes at right angles with respect to each other, each having an operative circuit, including two controlled current paths between the cathode and a pair of plates facing each other at opposite sides of the cathode, means to supply said circuits and coils with current, the currents flowing through an opposition coil in the position of rest of the movable control grid neutralizing each other, and the currents set up upon displacement of the control grid by the magnetic member, producing an electromagnetic action of each opposition coil on the magnetic member opposed to the motion of the said member producing the current flow through the coil, and an indicator for indicating the movement of the magnetic member and including a magnetic indicating member and electromagnetic repeater coils acting on the same, supplied with the currents controlled by the first named magnetic member and flowing through the opposition coils.

6. A system for the remote indication of angular motion as claimed in claim 5 with plate circuits for a pair of plates on opposite sides of the cathode bridged by a resistance, center tapped for connection with the cathode, the circuit of an opposition coil and of a repeater coil bridging said resistance.

7. A system for the remote indication of angular motion comprising a magnetic member arranged for movement in a plurality of directions and adapted to be moved by an external magnetic field, opposition coils surrounding said magnetic member with their axes angularly spaced, means for supplying the said coils with current, means for controlling the current flowing through the opposition coils, operated by the magnetic member, and producing a flow of currents in said coils engendering an electromagnetic action of the coils on the magnetic member opposed to the motion of said member producing the current regulation, said current controlling means including a plurality of current paths, and means operated by the magnetic member for varying the flow of current through said current paths, an indicator including a magnetic indicator member and repeater coils supplied by the currents controlled by the magnetic member and flowing through the opposition coils.

RODRIGO M. SMYTH-DÁVILA.

REFERENCES CITED

The following references are of record in the file of this patent:

UNITED STATES PATENTS

| Number | Name | Date |
| --- | --- | --- |
| 1,612,117 | Hewlett | Dec. 23, 1926 |
| 1,826,024 | Roller | Oct. 6, 1931 |
| 2,117,894 | Lenehan | May 17, 1938 |
| 2,154,260 | Brandenburger | Apr. 11, 1939 |
| 2,225,032 | Carbonara | Dec. 17, 1940 |
| 2,273,596 | Rylsky | Feb. 17, 1942 |
| 2,314,302 | Ziebolz | Mar. 16, 1943 |
| 2,379,778 | Allen | July 3, 1945 |